United States Patent
Kishigami et al.

(10) Patent No.: US 12,435,184 B2
(45) Date of Patent: Oct. 7, 2025

(54) REINFORCED RESIN COMPOSITION, MOLDED PRODUCT, AND METHOD OF IMPROVING TENSILE STRENGTH AT ELEVATED TEMPERATURES

(71) Applicant: ASAHI KASEI KABUSHIKI KAISHA, Tokyo (JP)

(72) Inventors: Hayato Kishigami, Tokyo (JP); Mihoko Yamamoto, Tokyo (JP)

(73) Assignee: ASAHI KASEI KABUSHIKI KAISHA, Tokyo (JP)

( * ) Notice: Subject to any disclaimer, the term of this patent is extended or adjusted under 35 U.S.C. 154(b) by 779 days.

(21) Appl. No.: 17/755,007

(22) PCT Filed: Oct. 21, 2020

(86) PCT No.: PCT/JP2020/039609
§ 371 (c)(1),
(2) Date: Apr. 19, 2022

(87) PCT Pub. No.: WO2021/079916
PCT Pub. Date: Apr. 29, 2021

(65) Prior Publication Data
US 2022/0389164 A1    Dec. 8, 2022

(30) Foreign Application Priority Data
Oct. 21, 2019  (JP) .................. 2019-192000

(51) Int. Cl.
*C08G 69/26* (2006.01)
*C08J 5/04* (2006.01)
*C08L 71/12* (2006.01)

(52) U.S. Cl.
CPC .............. *C08G 69/26* (2013.01); *C08J 5/043* (2013.01); *C08L 71/12* (2013.01); *C08J 2377/06* (2013.01); *C08J 2471/02* (2013.01); *C08L 2203/20* (2013.01)

(58) Field of Classification Search
CPC ... C08G 69/26; C08J 2377/06; C08J 2471/02; C08J 5/043; C08K 7/14; C08L 71/12; C08L 71/123; C08L 71/126; C08L 77/06
See application file for complete search history.

(56) References Cited

U.S. PATENT DOCUMENTS

| | | |
|---|---|---|
| 2002/0173584 A1 | 11/2002 | Ebert et al. |
| 2009/0029138 A1 | 1/2009 | Miyoshi et al. |
| 2009/0146109 A1 | 6/2009 | Elkovitch et al. |
| 2015/0175804 A1* | 6/2015 | Aepli .................. C08K 5/5313 524/100 |
| 2020/0087458 A1 | 3/2020 | Shinji et al. |

FOREIGN PATENT DOCUMENTS

| | | |
|---|---|---|
| CN | 106928702 A | 7/2017 |
| JP | 2000212438 A | 8/2000 |
| JP | 2002294071 A | 10/2002 |
| JP | 2005015528 A | 1/2005 |
| JP | 2007154107 A | 6/2007 |
| JP | 2007154128 A | 6/2007 |
| JP | 2007182550 A | 7/2007 |
| JP | 2007182551 A | 7/2007 |
| JP | 2007217620 A | 8/2007 |
| JP | 2011046781 A | 3/2011 |
| JP | 2013064091 A | 4/2013 |
| JP | 2013067705 A | 4/2013 |
| JP | 2014156573 A | 8/2014 |
| JP | 2015120908 A | 7/2015 |
| JP | 2016509121 A | 3/2016 |
| JP | 2017002205 A | 1/2017 |
| JP | 2018188534 A | 11/2018 |
| WO | 2018181995 A1 | 10/2018 |

OTHER PUBLICATIONS

Apr. 26, 2022, International Preliminary Report on Patentability issued in the International Patent Application No. PCT/JP2020/039609.

Nov. 10, 2022, the Supplementary European Search Report issued by the European Patent Office in the corresponding European Patent Application No. 20878257.3.

Jan. 12, 2021, International Search Report issued in the International Patent Application No. PCT/JP2020/039609.

* cited by examiner

*Primary Examiner* — Ana L. Woodward
(74) *Attorney, Agent, or Firm* — KENJA IP LAW PC

(57) ABSTRACT

The present disclosure is directed to provide a reinforced resin composition excellent in mechanical strength at elevated temperatures and a molded product including such a reinforced resin composition. A reinforced resin composition of the present disclosure includes (A) a polyamide; (B) a polyamide; (C) a polyphenylene ether; and (D) an inorganic filler, wherein a mass ratio of the component (C) with respect to 100 parts by mass of a sum of the component (A), the component (B), and the component (C) is from 20 to 50 parts by mass, $\Delta H_{TcMt}$ is 10 J/g or more, and $\Delta H_{MpMt}$ is 35 J/g or less.

17 Claims, No Drawings

REINFORCED RESIN COMPOSITION, MOLDED PRODUCT, AND METHOD OF IMPROVING TENSILE STRENGTH AT ELEVATED TEMPERATURES

TECHNICAL FIELD

The disclosure relates to a reinforced resin composition, a molded product, and a method of improving a tensile strength at high temperatures.

BACKGROUND

A wide variety of development efforts have been made on semi-aromatic polyamide resin compositions which are expected to have excellent properties, such as the mechanical strength, the heat resistance, and the chemical resistance.

Semi-aromatic polyamide resin compositions, however, are crystalline and therefore suffer from high molding shrinkage rates and large dimensional changes induced by water absorption. This limits their usage in applications where precise dimensional accuracies are required.

To address this issue, polyamide alloys have been proposed. Polyamide alloys are prepared by blending semi-aromatic polyamides with polyphenylene ether that is an amorphous resin with a low water absorption property to thereby reduce molding shrinkage rates and dimensional changes induced by water absorption (PTLs 1 to 4).

CITATION LIST

Patent Literature

PTL 1: JP 2007-182550 A
PTL 2: JP 2007-217620 A
PTL 3: JP 2011-46781 A
PTL 4: JP 2016-509121 A

SUMMARY

Technical Problem

In recent years, however, there has been a growing demand for components suited to the surface mount technology (SMT) which requires high dimensional accuracies, as typified by relay blocks and connectors. With an increase in the amount of information to be processed, heat generated by electronic circuits adjacent to SMT-compliant components increases, creating a demand for a high mechanical property at elevated temperatures.

The present disclosure has been conceived of in view of the aforementioned circumstances, and it is an object thereof to provide a reinforced resin composition excellent in mechanical strength at elevated temperatures and a molded product including such a reinforced resin composition.

Solution to Problem

As a result of extensive and diligent research in relation to the aforementioned problems problem, the present have found that a reinforced resin composition excellent in mechanical strength at elevated temperatures are obtained by combining specific polyamides and adjusting $\Delta H_{TcMt}$ and $\Delta H_{MpMt}$ to fall within certain ranges, thereby completing the present disclosure.

The present disclosure thus provides the following.
(1) A reinforced resin composition comprising:

(A) a polyamide comprising a dicarboxylic acid unit (a) containing a terephthalic acid unit in 60 to 100 mol %, and a diamine unit (b) containing an aliphatic diamine unit having a carbon number of 9 to 12 in 60 to 100 mol %;
(B) a polyamide comprising a dicarboxylic acid unit (c) containing an isophthalic acid unit in 60 to 100 mol %, and a diamine unit (d) containing an aliphatic diamine unit having a carbon number of 4 to 10 in 80 to 100 mol %;
(C) a polyphenylene ether; and
(D) an inorganic filler,
wherein a mass ratio of the component (C) with respect to 100 parts by mass of a sum of the component (A), the component (B), and the component (C) is from 20 to 50 parts by mass,
$\Delta H_{TcMt}$ expressed by the following expression is 10 J/g or more:

$\Delta H_{TcMt} = \Delta H_{Tc} \times \{$(a mass of the reinforced resin composition)/(a mass of a matrix component in the reinforced resin composition)$\}$, where $\Delta H_{Tc}$ is an enthalpy of crystallization of the reinforced resin composition measured by a DSC, and $\Delta H_{MpMt}$ expressed by the following expression is 35 J/g or less:

$\Delta H_{MpMt} = \Delta H_{Mp} \times \{$(the mass of the reinforced resin composition)/(the mass of the matrix component in the reinforced resin composition)$\}$, where $\Delta H_{Mp}$ is an enthalpy of fusion of the reinforced resin composition measured by the DSC.
(2) The reinforced resin composition according to (1), wherein the component (B) comprises the dicarboxylic acid unit (c) containing the isophthalic acid unit in 75 to 100%, and the diamine unit (d) containing the aliphatic diamine unit having a carbon number of 4 to 10 in 80 to 100%.
(3) The reinforced resin composition according to (1) or (2), wherein the component (A) comprises the dicarboxylic acid unit (a) containing the terephthalic acid unit in 60 to 100 mol %, and the diamine unit (b) containing a 1,9-nonane diamine unit and/or a 2-methyl-1,8-octane diamine unit in 60 to 100 mol %.
(4) The reinforced resin composition according to (3), wherein a molar ratio of the 1,9-nonane diamine unit to the 2-methyl-1,8-octane diamine unit (1,9-nonane diamine unit/2-methyl-1,8-octane diamine unit) in the component (A) is from 100/0 to 20/80.
(5) The reinforced resin composition according to any one of (1) to (4), wherein a mass ratio of the component (A) with respect to 100 mass % of a sum of the component (A) and the component (B) is from 50 to 90 mass %.
(6) The reinforced resin composition according to any one of (1) to (5), wherein a weight average molecular weight of the component (B) is from 15,000 to 35,000.
(7) The reinforced resin composition according to any one of (1) to (6), wherein the component (D) contains a fibrous inorganic filler or a needle-like inorganic filler.
(8) The reinforced resin composition according to (7), wherein the fibrous inorganic filler contains glass fibers.
(9) The reinforced resin composition according to any one of (1) to (5), wherein the component (D) contains a plate-like inorganic filler.
(10) he reinforced resin composition of (9), wherein the plate-like inorganic filler contains glass flakes.
(11) The reinforced resin composition according to any one of (1) to (10), further comprising (E) a compatibilizer.

(12) A molded product comprising the reinforced resin composition according to any one of (1) to (11).
(13) A method of improving a tensile strength at 70° C. of a resin composition containing (C) a polyphenylene ether, the method comprising:
adding, to the resin composition, (A) a polyamide comprising a dicarboxylic acid unit (a) containing a terephthalic acid unit in 60 to 100 mol %, and a diamine unit (b) containing an aliphatic diamine unit having a carbon number of 9 to 12 in 60 to 100 mol %, (B) a polyamide comprising a dicarboxylic acid unit (c) containing an isophthalic acid unit in 60 to 100 mol %, and a diamine unit (d) containing an aliphatic diamine unit having a carbon number of 4 to 10 in 80 to 100 mol %, and (D) an inorganic filler, to obtain an reinforced resin composition, such that a mass ratio of the component (C) with respect to 100 parts by mass of a sum of the component (A), the component (B), and the component (C) is from 20 to 50 parts by mass,
$\Delta H_{TcMt}$ expressed by the following expression is 10 J/g or more:

$\Delta H_{TcMt} = \Delta H_{Tc} \times \{$(a mass of the reinforced resin composition)/(a mass of a matrix component in the reinforced resin composition)$\}$, where $\Delta H_{Tc}$ is an enthalpy of crystallization of the reinforced resin composition measured by a DSC, and $\Delta H_{MpMt}$ expressed by the following expression is 35 J/g or less:

$\Delta H_{MpMt} = \Delta H_{Mp} \times \{$(the mass of the reinforced resin composition)/(the mass of the matrix component in the reinforced resin composition)$\}$, where $\Delta H_{Mp}$ is an enthalpy of fusion of the reinforced resin composition measured by the DSC.

DETAILED DESCRIPTION

The following provides a detailed description of an embodiment of this disclosure (hereinafter, referred to as the "present embodiment"). The following embodiment is for illustrative purposes only and shall not be construed restrictive in any way.
<Reinforced Resin Composition>
A reinforced resin composition according to the present embodiment comprises (A) a polyamide (hereinafter also referred to as the component (A)) comprising a dicarboxylic acid unit (a) containing a terephthalic acid unit in 60 to 100 mol %, and a diamine unit (b) containing an aliphatic diamine unit having a carbon number of 9 to 12 in 60 to 100 mol %; (B) a polyamide (hereinafter also referred to as the component (B)) comprising a dicarboxylic acid unit (c) containing an isophthalic acid unit in 60 to 100 mol %, and a diamine unit (d) containing an aliphatic diamine unit having a carbon number of 4 to 10 in 80 to 100 mol %; (C) a polyphenylene ether (hereinafter also referred to as the component (C)); and (D) an inorganic filler (hereinafter also referred to as the component (D)), wherein a mass ratio of the component (C) with respect to 100 parts by mass of a sum of the component (A), the component (B), and the component (C) is from 20 to 50 parts by mass, $\Delta H_{TcMt}$ expressed by the following expression is 10 J/g or more: $\Delta H_{TcMt} = \Delta H_{Tc} \times \{$(a mass of the reinforced resin composition)/(a mass of a matrix component in the reinforced resin composition)$\}$, where $\Delta H_{Tc}$ is an enthalpy of crystallization of the reinforced resin composition measured by a DSC, and $\Delta H_{MpMt}$ expressed by the following expression is 35 J/g or less: $\Delta H_{MpMt} = \Delta H_{Mp} \times \{$(the mass of the reinforced resin composition)/(the mass of the matrix component in the reinforced resin composition)$\}$, where $\Delta H_{Mp}$ is an enthalpy of fusion of the reinforced resin composition measured by the DSC.

The mass of the matrix component in the reinforced resin composition is measured as follows. Reinforced resin composition pellets are produced under the conditions described in EXAMPLES below, 100 g of the pellets are freeze-pulverized, and the pulverized powder is dissolved in hexafluoro-2-propanol followed by filtratation. After the insoluble component is dried under vacuum, the mass of the insoluble component is measured. The mass of the matrix component is determined by subtracting the mass of the insoluble content from 100 g, i.e., the mass of the reinforced resin composition.

As used herein, the enthalpy of crystallization and the enthalpy of fusion are the respective average values of three measurements using a DSC measurement apparatus. Specifically, measurements are carried out as follows. First, a sample of the reinforced resin composition pellets produced under the conditions described in EXAMPLES below is heated to 330° C. and held for 3 minutes using the DSC. The sample is then cooled to 100° C. at a temperature lowering rate of 10° C./min. The sample is then reheated to 340° C. at a temperature raising rate of 10° C./min. The peak top of the endothermic peak observed at this time is used as the melting point, and the enthalpy of fusion is calculated from this peak. The sample is then cooled again to 100° C. at a temperature lowering rate of 10° C./min. The peak top of the exothermic peak observed at this time is used as the crystallization peak, and the enthalpy of crystallization is calculated from this peak. If multiple endothermic peaks are observed, the peak top of the endothermic peak on the highest temperature side among the peaks with an enthalpy of 1 J/g or higher is used as the melting point.

$\Delta H_{TcMt}$ is 10 J/g or more, preferably 10 J/g or more and 45 J/g or less, more preferably 20 J/g or more and 45 J/g or less, and even more preferably 25 J/g or more and 45 J/g or less. When $\Delta H_{TcMt}$ is within any of these ranges, an appropriate crystallinity is maintained and a resin composition excellent in mechanical strength at elevated temperatures can be obtained and excellent surface appearance after being molted can be achieved. The value of $\Delta H_{TcMt}$ tends to increase as the mass ratio of the component (A) increases.

$\Delta H_{MpMt}$ is 35 J/g or less, preferably 3 J/g or more and 35 J/g or less, more preferably 3 J/g or more and 25 J/g or less, and even more preferably 3 J/g or more and 20 J/g or less. When $\Delta H_{MpMt}$ is within any of these ranges, a favorable morphology is formed and a resin composition excellent in mechanical strength at elevated temperatures can be obtained. The value of $\Delta H_{MpMt}$ tends to decreases as the mass ratio of the component (B) increases.

[(A) Polyamide]

The (A) polyamide according to the present embodiment includes a dicarboxylic acid unit (a) containing a terephthalic acid unit in 60 to 100 mol %, and a diamine unit (b) containing an aliphatic diamine unit having a carbon number of 9 to 12 in 60 to 100 mol %.

[[Dicarboxylic Acid Unit (a)]]

The dicarboxylic acid unit (a) in the present embodiment contains the terephthalic acid unit in 60 to 100 mol %, preferably 70 to 100 mol %, more preferably 80 to 100 mol %, even more preferably 90 to 100 mol %, and still even more preferably 100 mol %, in the unit (a). When the molar ratio is within any of these ranges, a resin composition excellent in heat resistance can be obtained. In addition, an excellent high cycle moldability is achieved upon molding of a molded product having a complex shape or a large molded product.

The dicarboxylic acid unit (a) may contain a dicarboxylic acid unit other than the terephthalic acid unit. Examples of such a dicarboxylic acid unit include, but are not limited to, units derived from aliphatic dicarboxylic acids such as malonic acid, dimethylmalonic acid, succinic acid, glutaric acid, adipic acid, 2-methyladipic acid, trimethyl adipic acid, pimelic acid, 2,2-dimethylglutaric acid, 3,3-diethylsuccinic acid, azelaic acid, sebacic acid, and sebellic acid; alicyclic dicarboxylic acids such as 1,3-cyclopentane dicarboxylic acid and 1,4-cyclohexane dicarboxylic acid; and aromatic dicarboxylic acids such as isophthalic acid, 2,6-naphthalene dicarboxylic acid, 2,7-naphthalene dicarboxylic acid, 1,4-naphthalene dicarboxylic acid, 1,4-phenylene dioxydiacetic acid, 1,3-phenylene dioxydiacetic acid, diphenic acid, 4,4'-oxydibenzoic acid, diphenylmethane-4,4'-dicarboxylic acid, diphenyl sulfone-4,4'-dicarboxylic acid, and 4,4'-biphenyl dicarboxylic acid, for example.

These units may be used alone or in a combination of two or more.

The amount of the dicarboxylic acid unit other than the terephthalic acid unit in the dicarboxylic acid unit (a) may be in a range of 40 mol % or less, and is more preferably in a range of 30 mol % or less, even more preferably in a range of 20 mol % or less, still even more preferably in a range of 10 mol % or less, and most preferably 0 mol %.

The molar ratio of the dicarboxylic acid unit (a) in the polyamide (A) is preferably from 40 to 60 mol % with respect to 100 mol % of the polyamide (A).

[[Diamine Unit (b)]]

The diamine unit (b) in the present embodiment contains an aliphatic diamine unit having a carbon number of 9 to 12 in 60 to 100 mol %, preferably 70 to 100 mol %, more preferably 80 to 100 mol %, even more preferably 90 to 100 mol %, and still more preferably 90 to 100 mol %, and still even more preferably 100 mol %. When the carbon number and the molar ratio of diamine unit are within any of the above ranges, a resin composition having an excellent balance between the low water absorption property and the heat resistance is obtained.

The diamine unit (b) is preferably an aliphatic diamine unit having a carbon number of 9 to 10, and more preferably an aliphatic diamine unit having a carbon number of 9, from the viewpoint of achieving a further excellent mechanical strength under high temperatures.

The diamine unit (b) may be linear or branched.

Example of the linear aliphatic diamine forming the diamine unit (b) include, but is not limited to, 1,9-nonane diamine (also referred to as nonamethylene diamine), decamethylene diamine, undecamethylene diamine, and dodecamethylene diamine.

Examples of the aliphatic diamine forming the aliphatic diamine unit having a substituent branched from the main chain for forming the diamine unit (b) include, but are not limited to, 2,2,4-trimethyl hexamethylene diamine, 2,4,4-trimethyl hexamethylene diamine, 2-methyl-1,8-octane diamine (also referred to as 2-methyl-octamethylene diamine), and 2,4-dimethyl-octamethylene diamine.

The diamine unit (b) preferably includes a 1,9-nonane diamine unit and/or a 2-methyl-1,8-octane diamine unit from the viewpoint of balancing the mechanical strength, the low water absorption property, and the heat resistance. Among these, using a combination of a 1,9-nonane diamine unit and a 2-methyl-1,8-octane diamine unit is preferred.

When the diamine unit (b) includes a 1,9-nonane diamine unit and/or a 2-methyl-1,8-octane diamine unit, the molar ratio of the 1,9-nonane diamine unit to the 2-methyl-1,8-octane diamine unit (1,9-nonane diamine unit/2-methyl-1,8-octane diamine unit) is preferably from 100/0 to 20/80. The molar ratio is more preferably from 95/5 to 60/40, and even more preferably from 90/10 to 75/25. When the molar ratio is within any of these ranges, a resin composition having particularly an excellent heat resistance tends to be provided.

The diamine unit (b) may contain a diamine unit other than the aliphatic diamine unit having a carbon number of 9 to 12. Example of such a diamine unit include, but are not limited to, units derived from aliphatic diamines such as ethylene diamine, propylene diamine, tetramethylene diamine, pentamethylene diamine, hexamethylene diamine, heptamethylene diamine, octamethylene diamine, and 2-methylpentamethylene diamine (also referred to as 2-methyl-1,5-diaminopentane); alicyclic diamines such as 1,4-cyclohexane diamine, 1,3-cyclohexane diamine, and 1,3-cyclopentane diamine; and aromatic diamines such as meta-xylene diamin.

These units may be used alone or in a combination of two or more.

The amount of the diamine unit other than the aliphatic diamine unit having a carbon number of 9 to 12 may be in a range of 40 mol % or less, and is more preferably in a range of 30 mol % or less, even more preferably in a range of 20 mol % or less, still even more preferably in a range of 10 mol % or less, and most preferably 0 mol %, in the diamine unit (b).

The molar ratio of the diamine unit (b) in the polyamide (A) is preferably from 40 to 60 mol % with respect to 100 mol % of the polyamide (A).

Preferred examples of the (A) polyamide in the present embodiment include Polyamide 9,T and Polyamide 10,T.

In addition, the (A) polyamide of the present embodiment contains a lactam unit such as a unit of butyrolactam, pivalolactam, ε-caprolactam, caprylolactam, enantholactam, and undecanolactam; an aminocarboxylic acid unit such as a unit of 6-aminocaproic acid, 11-aminoundecanoic acid, and 12-aminododecanoic acid; a trivalent or higher polyvalent amine unit such as a unit of bishexamethylene triamine; and a trivalent or higher polyvalent carboxylic acid unit such as a unit of trimellitic acid, trimethinic acid, and pyromellitic acid, to the extent that the purpose of the present embodiment is not impaired.

These units may be used alone or in a combination of two or more.

The ratio (mol %) of the sum of such units in the (A) polyamide is preferably 20 mol % or less, more preferably 10 mol % or less, and even more preferably 5 mol % or less.

[Content of (A) Polyamide]

In the reinforced resin composition of the present embodiment, when the sum of the components (A), (B), and (C) is taken as 100 mass %, the content of component (A) is preferably from 25 to 75 mass %, more preferably from 30 to 75 mass %, even more preferably from 30 to 70 mass %, and still even more preferably from 35 to 65 mass %. When the content of the component (A) is within any of these ranges, a resin composition having an excellent in mechanical strength, low water absorption property, dimensional accuracy, and weld strength at elevated temperatures can be obtained.

Further, in the reinforced resin composition of the present embodiment, when the sum of the component (A) and the component (B) is taken as 100 mass %, the content of component (A) is from 50 to 95 mass %, preferably from 50 to 90 mass %, and more preferably 60 to 90 mass %. When the content of the component (A) is within any of these ranges, a resin composition having an excellent in mechanical strength, low water absorption property, dimensional accuracy, and weld strength at elevated temperatures can be obtained.

[Production Method of (A) Polyimide]

The production method of the (A) polyamide is not particularly limited, and the following methods are exemplified, for example.

1) a method in which aqueous solutions or water suspensions of the dicarboxylic acid and the diamine, or an aqueous solution or water suspension of a mixture of the dicarboxylic acid and the diamine and an optional component such as a lactam and/or an aminocarboxylic acid (hereinafter, these may be simply referred to as "mixture thereof") are heated while a molten state is maintained to cause polymerization to take place (hereinafter referred to as the "thermal melt polymerization method");

2) a method in which aqueous solution(s) or water suspension(s) of the dicarboxylic acid and the diamine or a mixture thereof are heated, and a precipitated prepolymer is then extracted ("prepolymer method");

3) a method in which a polyamide obtained through the thermal melt polymerization method is maintained in the solid state at a temperature below the melting point to increase the degree of polymerization of the polyamide ("thermal melt polymerization-solid phase polymerization method");

4) a method in which aqueous solution(s) or water suspension(s) of the dicarboxylic acid and the diamine or a mixture thereof are heated, and a precipitated prepolymer is molten again in an extruder such as a kneader to increase the degree of polymerization thereof ("prepolymer-extrusion polymerization method");

5) a method in which aqueous solution(s) or water suspension(s) of the dicarboxylic acid and the diamine or a mixture thereof are heated, and the prepolymer is maintained in the solid state at a temperature below the melting point of the polyamide to increase the degree of polymerization of a precipitated prepolymer ("prepolymer-solid phase polymerization method");

6) a method in which the dicarboxylic acid and the diamine or a mixture thereof are caused to be polymerized while the solid state is maintained ("monomer-solid phase polymerization method"); and (7) a method in which "salts of the dicarboxylic acid and the diamine" or a mixture thereof are caused to be polymerized while the solid state is maintained ("salt/solid phase polymerization method"); and 8) a method in which polymerization is taken place using a dicarboxylic acid halide equivalent to a dicarboxylic acid and the diamine ("solution method").

The form of the polymerization in the production method of the (A) polyamide is not particularly limited, and batch and continuous polymerization are exemplified, for example.

A polymerization apparatus is not particularly limited, and any well-known apparatus (e.g., an autoclave type reactor, a tumbler type reactor, an extruder type reactor such as a kneader, for example) may be used.

[(B) Polyamide]

The (B) polyamide according to the present embodiment includes a dicarboxylic acid unit (c) containing an isophthalic acid unit in 60 to 100 mol %, and a diamine unit (d) containing an aliphatic diamine unit having a carbon number of 4 to 10 in 80 to 100 mol %.

[[Dicarboxylic Acid Unit (c)]]

The dicarboxylic acid unit (c) in the present embodiment contains the isophthalic acid in 60 to 100 mol %, preferably 70 to 100 mol %, more preferably 75 to 100 mol %, even more preferably 80 to 100 mol %, still even more preferably 90 to 100 mol %, and particularly preferably 100 mol %, in the isophthalic acid unit (c). When the molar ratio is within any of these ranges, the resin composition excellent in dimensional accuracy and weld strength can be obtained.

The dicarboxylic acid unit (c) may contain a dicarboxylic acid unit other than the isophthalic acid unit. Examples of the bicarboxylic acid unit other than the isophthalic acid unit include, but are not limited to: units derived from aliphatic dicarboxylic acids such as malonic acid, dimethylmalonic acid, succinic acid, glutaric acid, adipic acid, 2-methyladipic acid, trimethyladipic acid, pimelic acid, 2,2-dimethylglutaric acid, 3,3-diethylsuccinic acid, azelaic acid, sebacic acid, and suberic acid; alicyclic dicarboxylic acids such as 1,3-cyclopentane dicarboxylic acid and 1,4-cyclohexane dicarboxylic acid; and aromatic dicarboxylic acids such as terephthalic acid, 2,6-naphthalene dicarboxylic acid, 2,7-naphthalene dicarboxylic acid, 1,4-naphthalene dicarboxylic acid, 1,4-phenylene dioxydiacetic acid, 1,3-phenylene dioxydiacetic acid, diphenic acid, 4,4'-oxydibenzoic acid, diphenylmethane-4,4'-dicarboxylic acid, diphenyl sulfone-4,4'-dicarboxylic acid, and 4,4'-biphenyldicarboxylic acid, for example.

These units may be used alone or in a combination of two or more.

The amount of the dicarboxylic acid unit other than the isophthalic acid unit in the dicarboxylic acid unit (c) may be in a range of 40 mol % or less, and is more preferably in a range of 30 mol % or less, even more preferably in a range of 25 mol % or less, still even more preferably in a range of 20 mol % or less, particularly preferably in a range of 10 mol % or less, and most preferably 0 mol %.

The molar ratio of the dicarboxylic acid unit (c) in the polyamide (B) is preferably from 40 to 60 mol % with respect to 100 mol % of the polyamide (B).

[[Diamine Unit (d)]]

The diamine unit (d) in the present embodiment contains an aliphatic diamine unit having a carbon number of 4 to 10 in 80 to 100 mol %, preferably 90 to 100 mol %, and more preferably 100 mol %. When the molar ratio is within any of these ranges, a resin composition excellent in mechanical properties, such as the impact resistance and the tensile elongation, can be obtained.

The diamine unit (d) is preferably an aliphatic diamine unit having a carbon number of 4 to 6, and more preferably an aliphatic amine unit having a carbon number of 6, from the viewpoint of achieving a further excellent mechanical strength at elevated temperatures.

The diamine unit (d) may be linear or branched.

Examples of the linear aliphatic diamine forming the diamine unit (d) includes, but is not limited to, tetramethylene diamine, pentamethylene diamine, hexamethylene diamine, heptamethylene diamine, octamethylene diamine 1,9-nonane diamine, and decamethylene diamine.

Example of the aliphatic diamine forming the aliphatic diamine unit having a substituent branched from the main chain for forming the diamine unit (d) include, but are not limited to, 2-methylpentamethylene diamine (also referred to as 2-methyl-1,5-diaminopentane) 2,2,4-trimethyl hexamethylene diamine, 2,4,4-trimethyl hexamethylene diamine, 2-methyl-1,8-octane diamine (also referred to as 2-methyl-octamethylene diamine), and 2,4-dimethyl-octamethylene diamine, for example.

Among these, a hexamethylene diamine unit is preferably included as the diamine unit (d).

The diamine unit (d) may contain a diamine unit other than the aliphatic diamine unit having a carbon number of 4 to 10. Examples of such a diamine unit include, but are not limited to, units derived from aliphatic diamines such as ethylene diamine, propylene diamine, undecamethylene diamine, and dodecamethylene diamine; alicyclic diamines such as 1,4-cyclohexane diamine, 1,3-cyclohexane diamine, and 1,3-cyclopentane diamine; and aromatic diamines such as meta-xylene diamine.

These units may be used alone or in a combination of two or more.

The amount of the diamine unit other than the aliphatic diamine unit having a carbon number of 4 to 10 included in the diamine unit (d) may be in a range of 20 mol % or less, and is preferably in a range of 10 mol % or less, and more preferably 0 mol %.

The molar ratio of the diamine unit (d) in the polyamide (B) is preferably from 40 to 60 mol % with respect to 100 mol % of the polyamide (B).

Preferred examples of the (B) polyamide of the present embodiment include Polyamide 6,I, Polyamide 6,I/6,T and Polyamide 6,I/6,6.

In addition, the (B) polyamide may contain a lactam unit such as a unit of butyrolactam, pivalolactam, ε-caprolactam, caprylolactam, enantholactam, and undecanolactam; an aminocarboxylic acid unit such as a unit of 6-aminocaproic acid, 11-aminoundecanoic acid, and 12-aminododecanoic acid; a trivalent or higher polyvalent amine unit such as a unit of bishexamethylene triamine; and a trivalent or higher polyvalent carboxylic acid unit such as a unit of trimellitic acid, trimethinic acid, and pyromellitic acid, to the extent that the purpose of the present embodiment is not impaired.

These units may be used alone or in a combination of two or more.

The ratio (mol %) of the sum of such units in the polyamide (B) is preferably 20 mol % or less, more preferably 10 mol % or less, and even more preferably 5 mol % or less with respect to the sum of polyamides.

[[Molecular Weight of (B) Polyamide]]

In the present embodiment, the weight average molecular weight (hereinafter referred to as Mw) of the component (B) is preferably from 10,000 to 50,000, more preferably from 15,000 to 45,000, even more preferably from 15,000 to 35,000, still even more preferably from 20,000 to 40,000, and particularly preferably from 25,000 to 35,000. When Mw of the component (B) is within any of these ranges, excellent mechanical strength and weld strength can be achieved at elevated temperatures.

Note that Mw can be measured using gel permeation chromatography (GPC), as will be described in EXAMPLES below.

[[Content of (B) Polyamide]]

In the reinforced resin composition of the present embodiment, when the sum of the components (A), (B), and (C) are taken as 100 mass %, the content of the component (B) is preferably from 3 to 40 mass %, more preferably from 5 to 40 mass %, and even more preferably from 5 to 35 mass %. When the content of the component (B) is within any of these ranges, a resin excellent in mechanical strength, low water absorption property, dimensional accuracy, and weld strength can be obtained.

Further, in the reinforced resin composition of the present embodiment, when the sum of the component (A) and the component (B) is taken as 100 mass %, the content of the component (B) is from 5 to 50 mass %, preferably from 5 to 40 mass %, and even more preferably from 10 to 40 mass %. When the content of the component (B) is within any of these ranges, a resin composition excellent in mechanical strength, low water absorption property, dimensional accuracy, and weld strength at elevated temperatures can be obtained.

[[Production Method of (B) Polyamide]]

The production method of the (B) polyamide is not particularly limited, and the various methods described as the production method for the (A) polyamide above can be used, for example.

[Physical Properties of Component (A) and Component (B)]

End groups in the polyamides contained in the resin composition of the present embodiment are involved in a reaction with the (C) polyphenylene ether described below. Generally, a polyamide-based resin has amino groups or carboxyl groups as end groups. In general, as the end carboxyl group concentration increases, the impact resistance tends to be decreased and the flowability tends to be increased. Further, in general, as the end amino group concentration increases, the impact resistance tends to be increased and the flowability tends to be decreased. Nevertheless, the physical properties of the resin composition of the present embodiment are not restricted to the above-described tendencies.

From the viewpoint of further improving the balance of the properties of the resin composition of the present embodiment, it is preferable that the respective ratios of the end amino group concentration to the end carboxyl group concentration in the components (A) and (B) are preferably 1.0 or less, and more preferably from 0.05 to 0.8. Setting the ratios of the end amino group concentration to the end carboxyl group concentration in the polyamides within any of the above ranges helps to maintain the balance between the flowability and impact resistance of the resin composition at an even higher level.

The respective end amino group concentrations in the components (A) and (B) is preferably from 1 to 80 µmol, more preferably from 5 to 60 µmol/g, even more preferably from 10 to 45 µmol/g, and still even more preferably from 20 to 40 µmol/g. Setting the end amino group concentrations within any of the above ranges helps to maintain the balance between the flowability and the impact resistance of the resin composition of the present embodiment, at an even higher level.

The respective end carboxyl group concentrations of the components (A) and (B) are preferably from 20 to 150 µmol/g, and more preferably from 30 to 130 µmol/g. Setting the end carboxyl group concentrations within any of the above ranges helps to maintain the balance between the flowability and the impact resistance of the resin composition of the present embodiment, at an even higher level.

The respective end group concentrations of the polyamides can be adjusted using well-known methods. For example, one example is a method in which one or more selected from diamine compounds, monoamine compounds, dicarboxylic acid compounds, monocarboxylic acid compounds, and the like are added during polymerization of the polyamide such that certain end group concentrations are achieved.

The end amino group concentration and the end carboxyl group concentration can be measured by various methods. For example, using $^1$H-NMR to determine the concentrations from integral values of the corresponding characteristic signals is preferred from the viewpoint of the accuracy and simplicity. A specific example of a method for quantifying the end group concentrations in a polyamide resin is the method described in JP H07-22869 A, for example. Specifically, the numbers of the respective end groups are preferably determined by $^1$H-NMR (500 MHz, measured at 50° C. in deuterated trifluoroacetic acid) to determine the integral values of the characteristic signals corresponding to the end groups, from the viewpoint of the accuracy and simplicity. In the case where the characteristic signal of ends capped by an end-capping agent cannot be identified, the limiting viscosity [η] of a polyamide is measured and the total number of end groups in the molecular chain is calculated from the relationship in the following equation.

$$Mn=21900[\eta]-7900 (Mn \text{ represents the number average molecular weight})$$

$$\text{Total number of end groups in molecular chain (eq/g)}=2/Mn$$

In the polyamides of the component (A) and the component (B), 10 to 95% of the end groups in the molecular chain are preferably capped by an end-capping agent. The lower limit of the ratio of the capped end groups in the molecular chain of the polyamide (end capped ratio) is more preferably 40% or more, and even more preferably 60% or more. Setting the end capped ratio equal to or higher than any of the above lower limits prevents the viscosity from being increased during molding of the resin composition of the present embodiment. In addition, the upper limit of the end capped ratio is preferably 95% or less, and more preferably 90% or less. Setting the end capped ratio equal to or lower than any of the above upper limits further improves the impact resistance and the surface appearance of a molded product.

The end capped ratio of a polyamide can be determined according to the following formula (1) by measuring the respective numbers of end carboxyl groups, end amino groups, and end groups capped by an end-capping agent in the polyamide.

$$\text{End capped ratio (\%)}=[(\alpha-\beta)/\alpha]\times 100 \quad (1)$$

(In the formula, α is the total number of end groups in the molecular chain (in moles; this is usually equal to twice the number of polyamide molecules) and β is the total number of uncapped carboxyl end groups and amino end groups remained (in moles)).

There is no particular limitation on an end-capping agent as long as it is a monofunctional compound having reactivity with the amino group or carboxyl group at ends of a polyamide. However, a monocarboxylic acid and a monoamine are preferred from the viewpoint of the reactivity and the stability of capped ends, and a monocarboxylic acid is more preferred from the viewpoint of ease of handling. Other than these, acid anhydrides, monoisocyanates, mono acid halides, monoesters, mono alcohols, and the like can be used as the end-capping agent.

The monocarboxylic acid used as the end-capping agent is not limited as long as it has reactivity with amino groups, and examples thereof include aliphatic monocarboxylic acids such as acetic acid, propionic acid, butyric acid, valeric acid, caproic acid, caprylic acid, lauric acid, tridecanoic acid, myristic acid, palmitic acid, stearic acid, pivalic acid, and isobutyric acid; alicyclic monocarboxylic acids such as cyclohexanecarboxylic acid; aromatic monocarboxylic acids such as benzoic acid, toluic acid, α-naphthalenecarboxylic acid, β-naphthalenecarboxylic acid, methylnaphthalenecarboxylic acid, and phenylacetic acid; and any mixtures of these, for example. Among these, acetic acid, propionic acid, butyric acid, valeric acid, caproic acid, caprylic acid, lauric acid, tridecanoic acid, myristic acid, palmitic acid, stearic acid, and benzoic acid are preferred and acetic acid and benzoic acid are more preferred, from the viewpoints of the reactivity, the stability of capped ends, and the economic efficiency.

The monoamine used as the end-capping agent is not particularly limited to as long as it has reactivity with carboxyl groups, and examples thereof include aliphatic monoamines such as methylamine, ethylamine, propylamine, butylamine, hexylamine, octylamine, decylamine, stearylamine, dimethylamine, diethylamine, dipropylamine, and dibutylamine; alicyclic monoamines such as cyclohexylamine and dicyclohexylamine; aromatic monoamines such as aniline, toluidine, diphenylamine, and naphthylamine; any mixture thereof, for example. Among these, butylamine, hexylamine, octylamine, decylamine, stearylamine, cyclohexylamine, and aniline are preferred and butylamine, hexylamine and octylamine are more preferred, from the viewpoints of the reactivity, the boiling point, the stability of capped ends, and the economic efficiency.

A polyamide other than the polyamide components described above may be added at any stage as necessary to the extent that the effects of the present embodiment are not impaired.

Examples of such an additive component include, but are not limited to, Polyamide 4, Polyamide 6, Polyamide 11, Polyamide 12, Polyamide 4,6, Polyamide 5,6, Polyamide 6,6, Polyamide 6,10, Polyamide 6,12, Polyamide 6,T, Polyamide 6,T/6,I, and Polyamide MXD,6 (meta-xylene adipamide), for example.

For the purpose of further improving the heat stability of the resin composition, a transition metal and/or halogen may be included in the resin composition as well as in the polyamide.

The transition metal is not particularly limited, and examples thereof include iron, copper, cerium, nickel, and cobalt, for example. Among these, copper is preferred from the viewpoint of the long-term thermal stability. The halogen is not particularly limited, but bromine and iodine are preferred from the viewpoint of preventing corrosion of production facilities or the like.

The content of the transition metal is preferably 1 ppm or more and less than 200 ppm by mass, and more preferably 5 ppm or more and less than 100 ppm on the mass basis when the sum of the component (A), the component (B), and the component (C) to be described below of the present embodiment is taken as 100 mass %. Further, the content of the halogen is preferably 500 ppm or more and less than 1500 ppm by mass, and more preferably 700 ppm or more and less than 1200 ppm on the mass basis when the sum of the component (A), the component (B), and the component (C) to be described below of the present embodiment is taken as 100 mass %.

The method of adding such transition metal and/or halogen to the resin composition is not particularly limited, and examples thereof include, for example, the method of adding them in powders in the step of melt-kneading the polyamides and the component (C) to be described below; the method of adding them during polymerization of a polyamide; and the method of producing master pellets of a polyamide containing the transition metal and/or halogen in a high concentration, followed by adding the master pellets to the resin composition. Among these methods, preferred are the method of adding them during polymerization of a polyamide; and the method of producing master pellets of a polyamide containing the transition metal and/or halogen with a high concentration, followed by adding the master pellets to the resin composition.

[(C) Polyphenylene Ether]

Examples of the (C) polyphenylene ether in the present embodiment include, but are not limited to, poly(2,6-dimethyl-1,4-phenylene ether), poly(2-methyl-6-ethyl-1,4-phenylene ether), poly(2-methyl-6-phenyl-1,4-phenylene ether), and poly(2,6-dichloro-1,4-phenylene ether), for example. Further examples include copolymers of 2,6-dimethylphenol and other phenols (e.g., a copolymer 2,6-dimethylphenol and 2,3,6-trimethylphenol and a copolymer of 2,6-dimethylphenol and 2-methyl-6-butylphenol, as described in JP H52-017880 B. Among these, preferred are poly(2,6-dimethyl-1,4-phenylene ether) and a copolymer of 2,6-dimethylphenol and 2,3,6-trimethylphenol, and a mixture of these, from the viewpoint of the mechanical stability.

These may be used alone or in combination of two or more.

The production method of the (C) polyphenylene ether is not particularly limited, and any well-known method may be employed. The production methods described in U.S. Pat. Nos. 3,306,874 B, 3,306,875 B, 3,257,357 B, 3,257,358 B, JP S50-051197 A, JP S52-017880 B, JP S63-152628 A, and other literature are exemplified, for example.

The lower limit of the reduced viscosity of the (C) polyphenylene ether (measured in a 0.5-g/dL chloroform solution at 30° C. using an Ubbelohde viscosity tube) is preferably 0.30 dL/g or more, more preferably 0.35 dL/g or more, and even more preferably 0.38 dL/g or more. The upper limit of the reduced viscosity of the polyphenylene ether is preferably 0.80 dL/g or less, more preferably 0.75 dL/g or less, and even more preferably 0.55 dL/g or less. The combination of the lower limit and the upper limit of the reduced viscosity of the polyphenylene ether is preferably 0.30 to 0.80 dL/g, more preferably 0.35 to 0.75 dL/g, and even more preferably 0.38 to 0.55 dL/g. When the reduced viscosity of the (C) polyphenylene ether is within any of the above ranges, the impact resistance and heat resistance are further improved.

The polyphenylene ether (C) may be a mixture of two or more polyphenylene ethers having different reduced viscosities.

The reduced viscosity of the (C) polyphenylene ether can be controlled by adjusting the production conditions, such as the amount of a catalyst used and the polymerization time during polymerization.

For stabilizing the polyphenylene ether (C), any of well-known stabilizers may be blended into the resin composition. Examples of the stabilizer include metal-based stabilizers such as zinc oxide and zinc sulfide; organic stabilizers such as hindered phenol-based stabilizers, phosphorus-based stabilizers, and hindered amine-based stabilizers, for example.

The content of the stabilizer is preferably less than 5 parts by mass with respect to 100 parts by mass of the (C) polyphenylene ether.

Further, in addition to the stabilizer described above, other additive(s) or the like blendable to the (C) polyphenylene ether can also be blended into the resin composition. In that case, the sum of the contents of the other additives is preferably less than 10 parts by mass with respect to 100 parts by mass of the (C) polyphenylene ether.

[Content of Component (C)]

In the reinforced resin composition of the present embodiment, the content of the (C) polyphenylene ether is from 20 to 50 mass %, preferably from 25 to 50 mass %, more preferably from 25 to 45 mass %, and even more preferably from 25 to 40 mass %, when the sum of the component (A), the component (B), and the component (C) is taken as 100 mass %.

In general, when an amorphous polyamide is blended with a semi-aromatic polyamide, the mechanical strength at elevated temperatures is greatly reduced because the crystallinity of the semi-aromatic polyamide is inhibited. Nevertheless, when the content of the (C) polyphenylene ether is controlled to fall within any of the above ranges, a composition excellent in mechanical strength, heat resistance, moldability, and impact resistance at elevated temperatures is obtained.

Note that the content of the component (C) can be determined by means of the calibration curve method by a Fourier transform infrared spectroscopy (FT-IR) measurement.

Preferably, the (C) polyphenylene ether is dispersed in the flame-retardant thermoplastic resin composition of the present embodiment such that the phase containing the component (A) and/or the component (B) forms a continuous phase and the phase containing the (C) polyphenylene ether forms a dispersed phase, from the viewpoint of the balance of the heat resistance, the mechanical strength, and the moldability. In this case, the phase containing the (C) polyphenylene ether is preferably present as a dispersed phase having an average particle diameter from 0.1 to 5 μm when observed under a transmission electron microscope at a magnification of 10,000 times. The average particle diameter of the phase containing the (C) polyphenylene ether is more preferably from 0.1 to 3 μm, and even more preferably from 0.1 to 2 μm.

[(D) Inorganic Filler]

The resin composition in the present embodiment includes (D) an inorganic filler.

Examples of the (D) inorganic filler of the present embodiment include, but are not limited to, fibrous inorganic fillers such as glass fibers, potassium titanate fibers, gypsum fibers, brass fibers, stainless steel fibers, steel fibers, ceramic fibers, and boron whisker fibers; plate-like inorganic fillers such as mica, talc, kaolin, calcined kaolin, and glass flakes; granular inorganic fillers such as titanium oxide, apatite, glass beads, silica, calcium carbonate, and carbon black; and needle-like inorganic fillers such as wollastonite and zonotolite. Among these, fibrous inorganic fillers, plate-like inorganic fillers, and needle-like inorganic fillers are preferred; talc, wollastonite, glass flakes, glass fibers are more preferred; and glass flakes and glass fibers are even more preferred.

These inorganic fillers may be used singly or in a combination of two or more.

The inorganic filler may be surface treated with a surface treatment agent such as a silane coupling agent using a well-known method.

The content of the (D) inorganic filler is preferably from 10 to 60 mass %, more preferably from 10 to 50 mass %, and even more preferably from 20 to 50 mass %, when the sum of the component (A), the component (B), the component (C), and the component (D) is taken as 100 mass %.

[(E) Compatibilizer]

The resin composition in the present embodiment preferably further includes (E) a compatibilizer from the viewpoint of improving the compatibility between the polyamides and the polyphenylene ether. The (E) compatibilizer is contained primarily for the purpose of improving the physical properties of the mixture of the polyamides and polyphenylene ether.

The (E) compatibilizer refers to a multifunctional compound that interacts with either or both of the polyphenylene ether and the polyamides. The interaction may be chemical (e.g., grafting) or physical (e.g., a change in the surface property of a dispersed phase). In any case, the compatibility of the resultant mixture of the polyamides and the polyphenylene ether is improved.

Examples of the (E) compatibilizer include those described in JP H8-48869 A and JP H9-124926 A. All of such well-known compatibilizers can be used, and two or more of compatibilizers can be used in combination.

Among the (E) compatibilizers described above, preferred are one or more are selected from the group consisting of citric acid, maleic acid, itaconic acid, and anhydrides of these. Among these, maleic anhydride and/or citric acid are more preferred.

The content of the compatibilizer (E) is preferably from 0.01 to 10 parts by mass, more preferably from 0.10 to 5 parts by mass, and even more preferably from 0.10 to 2 parts by mass, when the sum of the component (A), the component (B), and the component (C) is taken as 100 parts by mass.

[Additive Components]

In the present embodiment, in addition to the above-described components, additive components may be added at any stage as necessary to the extent that the effects of the present embodiment are impaired.

Such additive components include, but are not limited to, another thermoplastic resin such as polyesters and polyolefins; plasticizers (such as low molecular weight polyolefins, polyethylene glycols, and fatty acid esters); antistatic agents; nucleating agents; flow modifiers (such as calcium stearate, sodium stearate, and lithium stearate as metal salts of stearic acid); fillers; reinforcing agents; various peroxides; spreading agents; copper-based heat stabilizers; halogenated salts of alkali metals such as potassium iodide and potassium bromide; organic heat stabilizers represented by hindered phenol oxidation and degradation inhibitors; antioxidants; ultraviolet absorbers; light stabilizers; and colorants (e.g., well-known inorganic pigments such as titanium oxide, carbon black, titanium yellow, iron oxide-based pigments, ultramarine, cobalt blue, chromium oxide, spinel green, lead chromate-based pigments, cadmium-based pigments; and organic pigments such as Azo Lake pigments, benzimidazolone pigments, diarylide pigments, and condensed azo pigments; phthalocyanine-based pigments such as phthalocyanine blue and phthalocyanine green; fused polycyclic pigments such as isoindrinone pigments, quinophthalone pigments, quinacridone pigments, perylene pigments, anthraquinone pigments, perinone pigments, and dioxazine violet; and azine dyes).

The amount of each of these additive components added is preferably 10 mass % or less in 100 mass % of the entire resin composition. The amount is more preferably 5 mass % or less and even more preferably 3 mass % or less.

The mass ratio of the sum of the component (A) and the component (B) in the reinforced resin composition of the present embodiment (taken as 100 parts by mass) is preferably from 10 to 80 parts by mass, more preferably from 20 to 70 parts by mass, and even more preferably from 30 to 60 parts by mass.

The mass ratio of the sum of the component (A), the component (B), and the component (C) in the reinforced resin composition of the present embodiment (taken as 100 parts by mass) is preferably from 20 to 100 parts by mass, more preferably from 30 to 90 parts by mass, and even more preferably from 40 to 80 parts by mass.

The mass ratio of the sum of the component (A), the component (B), the component (C), and the component (D) in the reinforced resin composition of the present embodiment (taken as 100 parts by mass) is preferably 80 parts by mass or more, and more preferably 90 parts by mass or more.

[Method of Producing Reinforced Resin Composition]

The reinforced resin composition of the present embodiment can be produced using the above-described components (A) to (D), and the component (E) and additive components, as necessary, by a conventionally well-known melt kneading method.

For example, the method of melt kneading using a single-screw extruder, a twin-screw extruder, a roller, a kneader, a Brabender plastograph, and a Banbury mixer, and the like is mentioned, among which the method using a twin-screw extruder is preferred, and the method using a twin-screw extruder provided with an upstream feed port and one or more downstream feed ports is even more preferred.

The melt kneading temperature is preferably in a range from 280 to 360° C.

[Molded Product and Manufacturing Method Thereof, Etc.]

The reinforced resin composition of the present embodiment can be molded into a molded product using a conventionally well-known molding method, such as injection molding, extrusion molding, press molding, blow molding, calendar molding, and film casting. In other words, the molded product of the present embodiment contains the reinforced resin composition.

The molding method is not particularly limited, and any well-known method can be employed. For example, the reinforced resin composition may be molten in a cylinder of an injection molding machine and injected into a mold in a predetermined shape to thereby produce a molded product having the predetermined shape.

Alternatively, the reinforced resin composition may be molten in an extruder where the cylinder temperature is controlled and spun out of a spinneret nozzle to thereby produce a fibrous molded product.

Further alternatively, the reinforced resin composition may be molten in an extruder where the cylinder temperature is controlled and extruded from a T-die to thereby produce a molded product in the form of a film or sheet.

Further, a coating layer made of a paint, a metal, or a different polymer may be formed on the surface of a molded product produced by such a method. In other words, a laminated body having an molded product of the present embodiment and a coating layer formed on at least a part of a surface of the molded product may be produced. The coating layer may single-layered or multi-layered. The lamination method is not particularly limited, and a suitable method may be adopted in view of the purpose of use thereof or the shape of the molded product.

[Method of Improving Tensile Strength at 70° C.]

The method of improving the tensile strength at 70° C. is a method of improving the tensile strength at 70° C. of a resin composition containing (C) a polyphenylene ether.

Preferably, the method is a method of improving a tensile strength at 70° C. of a resin composition containing (C) a polyphenylene ether, the method comprising: adding, to the resin composition, (A) a polyamide comprising a dicarboxylic acid unit (a) containing a terephthalic acid unit in 60 to 100 mol %, and a diamine unit (b) containing an aliphatic diamine unit having a carbon number of 9 to 12 in 60 to 100 mol %, (B) a polyamide comprising a dicarboxylic acid unit (c) containing an isophthalic acid unit in 60 to 100 mol %, and a diamine unit (d) containing an aliphatic diamine unit having a carbon number of 4 to 10 in 80 to 100 mol %, and (D) an inorganic filler, to obtain an reinforced resin composition, such that a mass ratio of the component (C) with respect to 100 parts by mass of a sum of the component (A), the component (B), and the component (C) is from 20 to 50 parts by mass, $\Delta H_{TcMt}$ expressed by the following expression is 10 J/g or more:

$$\Delta H_{TcMt} = \Delta H_{Tc} \times \{\text{(a mass of the reinforced resin composition)/(a mass of a matrix component in the reinforced resin composition)}\},$$

where $\Delta H_{Tc}$ is an enthalpy of crystallization of the reinforced resin composition measured by a DSC, and $\Delta H_{MpMt}$ expressed by the following expression is 35 J/g or less:

$$\Delta H_{MpMt} = \Delta H_{Mp} \times \{\text{(the mass of the reinforced resin composition)/(the mass of the matrix component in the reinforced resin composition)}\},$$

where $\Delta H_{Mp}$ is an enthalpy of fusion of the reinforced resin composition measured by the DSC.

In addition to the component (C), the aforementioned resin composition may contain other components (e.g., the additive components described above). Preferably, the aforementioned resin composition contains neither the component (A) nor the component (B). Furthermore, the aforementioned resin composition preferably does not contain the component (D). The mass ratio of the component (C) is preferably from 8 to 45 parts by mass with respect to 100 parts by mass of the aforementioned resin composition.

In the method of the present embodiment, it is preferable that the component (A) and the component (B) are simultaneously added to the aforementioned resin composition, followed by addition of the component (D). Kneading is preferably carried out by a twin-screw extrusion or the like.

Examples of the method of adjusting $\Delta H_{TcMt}$ described above to 10 J/g or more include the method of adjusting the content of terephthalic acid unit in the dicarboxylic acid unit (a) in the polyamide (A), adjusting the content of isophthalic acid unit in the dicarboxylic acid unit (c) in the polyamide (B), and adjusting the ratio of the polyamide (A) to the polyamide (B), for example.

Examples of the method of adjusting $\Delta H_{MpMt}$ described above to 35 J/g or less include the method of adjusting the content of terephthalic acid unit in the dicarboxylic acid unit (a) in the polyamide (A), adjusting the content of isophthalic acid unit in the dicarboxylic acid unit (c) in the polyamide (B), and adjusting the ratio of the polyamide (A) in the polyamide (A) to the polyamide (B), for example.

Examples of simultaneously achieving both $\Delta H_{TcMt}$ described above being 10 J/g or more and $\Delta H_{MpMt}$ described above being 35 J/g or less include the method by adjusting the content of the component (B) so as to fall within a range from 5 to 50 mass % relative to the sum of the component (A) and the component (B) taken as 100 mass %, when the content of terephthalic acid unit in the dicarboxylic acid unit (a) in the polyamide (A) is 100 mol % and the content of isophthalic acid unit in the dicarboxylic acid unit (b) in the polyamide (B) is 100 mol %, for example.

In particular, adjusting the enthalpy of crystallization and the enthalpy of fusion so as to fall within certain ranges can improve the strength at elevated temperatures while maintaining a superior low water absorption property compared to polyamide resin compositions containing no polyphenylene ether.

EXAMPLES

The following provides a description of specific examples and comparative examples. However, the present disclosure is not limited to the following examples. The measurement methods and the raw materials used in examples and comparative examples are as follows.

[Measurement Method of Properties]

((1) Molding Cycle Performance)

Resin composition pellets produced in each of the examples and comparative examples to be described below were molded into a test piece of JIS K7162-5A in an injection molding machine (EC75SXII manufactured by Toshiba Machine Co., Ltd.) where the cylinder temperature was set to 320° C. and the mold temperature was set to 110° C. under the following conditions. If a test piece could not be released because it stuck to the mold, the cooling time was extended in increments of 5 seconds and the cooling time (seconds) until the test piece became able to be released was determined.

Average injection molding rate: 100 mm/sec Injection pressure: calculated by determining the short shot pressure (the maximum pressure at which the mold was not completely filled with the resin) and adding 20% of the short shot pressure ((2) Notched Charpy Impact Strength)

Resin composition pellets produced in each of the examples and comparative examples to be described below were molded into multipurpose test pieces of JIS K7139 Type A in the injection molding machine (EC75SXII manufactured by Toshiba Machine Co., Ltd.) where the cylinder temperature was set to 320° C. and the mold temperature was set to 110° C. A test piece with dimensions of 80 mm×10 mm×4 mm was cut out from a produced multipurpose test piece. The Charpy impact strength (kJ/m²) was measured under the temperature condition of 23° C. in accordance with ISO 179.

The evaluation criteria was such that a higher measured value indicated a better impact resistance.

((3) Tensile Strength)

The tensile yield strength (MPa) was measured using a multipurpose test piece of JIS K7139 Type A molded in (2) above at a speed of 5 mm/min under the temperature condition of 70° C. in accordance with ISO 527 for an evaluation of the tensile strength at elevated temperatures. In addition, the tensile yield strength (MPa) was measured using another multipurpose test piece of JIS K7139 Type A made in the same way at a speed of 5 mm/min under the temperature condition of 23° C. in accordance with ISO 527 for an evaluation of a tensile strength (at 23° C.).

The evaluation criteria was such that a higher measured value was indicated better mechanical strength at each temperature.

((4) Weld Strength)

Resin composition pellets produced in each of the examples and comparative examples to be described below were molded into multipurpose test pieces of JIS K7139 Type A in the injection molding machine (EC75SXII manufactured by Toshiba Machine Co., Ltd.) where the cylinder temperature was set to 330° C. and the mold temperature was set to 160° C. under the following conditions using a double gates mold.

Average injection molding rate: 30 mm/sec

Holding pressure: 80% of the maximum peak injection pressure
Injection time: 50 seconds
Pressure holding time: 20 seconds The test piece was used to measure the tensile yield strength (MPa) at a speed of 5 mm/min under the temperature condition of 23° C. in accordance with ISO 527.

The evaluation criteria was such that a higher measured value indicated a better weld strength.

Raw Materials Used in Examples and Comparative Examples ((A) Polyamide)
<(A-1) Polyamide 9,T (Hereinafter Referred to as "PA9T")>

A 40-L autoclave was charged with 9743.5 g of terephthalic acid, 8072.3 g of 1,9-nonane diamine, 1424.6 g of 2-methyl-1,8-octane diamine, 329.7 g of benzoic acid, 19.6 g of sodium hypophosphite monohydrate (0.1 mass % with respect to the raw materials), and 5 L of distilled water, and was replaced with nitrogen.

The mixture was stirred at 100° C. for 30 minutes, and the internal temperature was raised to 210° C. over 2 hours. At this time, the pressure of the autoclave increased to 22 kg/cm². After the reaction was continued for 1 hour, the temperature was raised to 230° C. The temperature was maintained at 230° C. for 2 hours, and the reaction was caused to take place while the pressure was maintained at 22 kg/cm² by gradually venting water vapor. Then, the pressure was reduced to 10 kg/cm² over 30 minutes and the reaction was further caused to take place for another 1 hour to yield a prepolymer having a limiting viscosity [η] of 0.25 dL/g.

The resultant prepolymer was dried under reduced pressure at 100° C. for 12 hours, and pulverized into a size of 2 mm or less. The pulverized prepolymer was subjected to solid-phase polymerization at 230° C. at 0.1 mmHg for 10 hours to yield a polyamide having a melting point of 306° C. and a limiting viscosity [η] of 0.80 dL/g.

The end amino group concentration was measured according to the method for measuring the end amino group concentration described in EXAMPLES in JP H7-228689 A, and was determined to be 20 μmol/g.

This polyamide had a carboxylic acid unit containing the terephthalic acid unit in 100 mol %, and a diamine unit containing the 1,9-nonane diamine unit in 80 mol % and the 2-methyl-1,8-octane diamine unit in 20 mol %.

((B) Polyamide)
<(B-1) Polyamide 6,I (Hereinafter Referred to as "PA6I")>

A 50-mass % homogeneous aqueous solution of raw monomers was prepared by dissolving, to 1500 g of distilled water, 1500 g of equimolar salts of isophthalic acid and hexamethylene diamine and isophthalic acid in the amount of 1.5 mole % excess per the entire equimolar salt component. The aqueous solution was placed in a 5-L autoclave.

The 50-mass % homogeneous aqueous solution was concentrated by gradually venting water vapor until the concentration of the solution reached 70 mass % while stirring at a temperature of 110 to 150° C. The internal temperature was then raised to 220° C. At this time, the autoclave was pressurized to 1.8 MPa. A reaction was caused to take place for 1 hour while the pressure was maintained to 1.8 MPa until the internal temperature reached 245° C. by gradually venting water vapor.

The pressure was then lowered over 30 minutes. The interior of the autoclave was then maintained to a reduced pressure of 650 torr for 10 minutes using a vacuum apparatus. At this time, the final internal temperature of the polymerization was 265° C.

The reaction mixture was then extruded through a lower spinneret (nozzle) by pressurizing with nitrogen into strands, which were water-cooled, cut into pellets, and dried at 100° C. in a nitrogen atmosphere for 12 hours to yield a polyamide (ratio of the isophthalic acid unit in the dicarboxylic acid unit: 100 mol %).

The weight average molecular weight (Mw) and molecular weight distribution (Mw/Mn) of the obtained polyamide were measured by gel permeation chromatography (GPC, HLC-8020 manufactured by Tosoh Corporation, in hexafluoroisopropanol solvent using PMMA (polymethyl methacrylate) standard sample (manufactured by Polymer Laboratories, Inc.)), and Mw was determined to be 20,000 and Mw/Mn was determined to be 2.

The end amino group concentration was measured according to the above measurement method, and determined to be 8 μmol/g.

The above polyamide had a carboxylic acid unit containing the isophthalic acid in 100 mol % unit and a diamine unit containing the hexamethylene diamine unit in 100 mol %.
<(B-2) Polyamide 6,I/6,T (Hereinafter Referred to as "PA6I/6T")>

Polyamide 6I/6T ("Grivory 21" manufactured by Ems, Mw=27,000, Mw/Mn=2.2, ratio of an isophthalic acid unit in a dicarboxylic acid unit: 70 mol %, ratio of a hexamethylene diamine unit in a diamine unit: 100 mol %)
<(C) Polyphenylene Ether (Hereinafter Referred to as "PPE")>

A 2000-L jacketed stainless-steel polymerization tank equipped with an iron sparger for introduction of an oxygen-containing gas at the bottom of the polymerization tank, a stainless-steel stirring turbine blade, and a stainless-steel baffle, and having a reflux condenser on a vent gas line at the top of the polymerization tank was charged with 160.8 g of cupric oxide, 1209.0 g of a 47-mass % hydrogen bromide aqueous solution, 387.36 g of di-t-butylethylene diamine, 1875.2 g of di-n-butylamine, 5707.2 g of butyldimethylamine, 826 kg of toluene, and 124.8 kg of 2,6-dimethylphenol, while blowing nitrogen gas into the polymerization tank at a flow rate of 0.5 L/min. The contents of the polymerization tank were stirred until a homogeneous solution was obtained and the internal temperature of the polymerization tank reached 25° C.

Next, the sparger was used to introduce dry air into the polymerization tank at a rate of 1312 NL/min and polymerization was initiated. The air was passed for 110 minutes and the internal temperature was controlled to be 40° C. at the end of polymerization. At the end of the polymerization, the polymerization liquid was in a solution form.

Passage of the dry air was stopped and 100 kg of a 2.5-mass % aqueous solution of a tetrasodium salt of ethylenediaminetetraacetic acid (manufactured by Dojindo Molecular Technologies, Inc) was added to the polymerization mixture. The polymerized mixture was stirred at 70° C. for 150 minutes and then allowed to stand. The organic phase and the aqueous phase were separated by liquid-liquid separation (a disk centrifuge manufactured by GEA).

After the resultant organic phase was cooled to room temperature, a slurry was produced by adding methanol in an excess amount to precipitate polyphenylene ether. Filtration was carried out using a basket-type centrifuge (Model 0-15 produced by Tanabe Willtec Inc.).

After the filtration, methanol in an excess amount was charged in the basket-type centrifuge to repeat filtration to yield a wet polyphenylene ether. Next, the wet polyphenylene ether was fed into a Feather Mill (FM-1S manufactured by Hosokawa Micron Corporation) having a 10-mm round hole mesh set therein for pulverization. After the pulverization, the wet polyphenylene ether was kept at 150° C. under 1.5 mmHg for 1.5 hours in a conical dryer to obtain dry polyphenylene ether powder. The reduced viscosity (measured with a 0.5-g/dL chloroform solution at 30° C.) of the PPE was 0.40 dL/g.

<(D) Inorganic Filler>

Glass fiber (ECS03-T477" manufactured by Nippon Electric Glass Co., Ltd., fiber diameter: 13 μm, and chopped length: 3 mm).

<(E) Compatibilizer>

Maleic anhydride (special grade reagent) (Wako Pure Chemical Corporation)

<Additive Components>
1) Peroxide ("Perhexa 25B-40" manufactured by NOF Corporation)
2) Potassium iodide (hereinafter referred to as "KI") (manufactured by Wako Pure Chemical Corporation)
3) Black pigment (main component: carbon black) ("#960" manufactured by Mitsubishi Chemical Corporation, average primary particle diameter: 16 mg, DBP oil absorption value: 64 mL/100 g)

Examples 1 to 4 and Comparative Examples 1 to 3

A twin-screw extruder (ZSK-26MC manufactured by Coperion (Germany)) having three feed ports provided on the upstream, center, and downstream sides in the flow direction of the raw materials was used. Here, when the entire length of the extruder cylinder is taken as 1.0, the feed port located at L=0 relative to the upstream is referred to as the upstream feed port, the feed port located at L=0.4 is referred to as the center feed port, and the feed port located at L=0.6 is referred to as the downstream feed port. The raw materials were fed to the upstream feed port, the central feed port, and the downstream feed port using hoppers. The temperature from the upstream feed port to the center feed port was set to 320° C., and the temperature downstream to the center feed port was set to 310° C. The screw rotation speed was set to 300 revolutions per minute, and the discharge rate was set to 15 kg/h.

In addition, openings were respectively provided in the block directly upstream of the cylinder block at which the center feed port was located and in the cylinder block directly upstream to the die, and the residual volatile components and the oligomer were removed by vacuum suction. At this time, the degree of vacuum (absolute pressure) was set at 60 mmHg.

The raw materials were supplied and melt-kneaded in respective compositions listed in Table 1 below.

Strands extruded from the tip of the extruder die were cooled in a SUS strand bath filled with cooling water. The strands were then cut with a strand cutter to obtain resin composition pellets.

The moisture content of the obtained resin composition pellets was adjusted by drying in a dehumidifying dryer set at 80° C. for 1 hour after extrusion, and then placed into an aluminum-coated moisture barrier bag. The moisture content of the resin composition pellets at this time was approximately 200 to 300 ppm.

The obtained resin composition pellets were used to conduct evaluations by the methods mentioned above. The results are summarized in Table 1.

TABLE 1

|  |  |  |  | Example 1 | Example 2 | Example 3 | Example 4 | Comp. Example 1 | Comp. Example 2 | Comp. Example 3 |
|---|---|---|---|---|---|---|---|---|---|---|
| Reinforce resin composition | Upstream feed port | Component (C) | mass % | 18.09 | 18.09 | 18.09 | 18.09 | 18.09 | 18.09 | 18.09 |
|  |  | Component (E) | mass % | 0.18 | 0.18 | 0.18 | 0.18 | 0.18 | 0.18 | 0.18 |
|  |  | Peroxide | mass % | 0.05 | 0.05 | 0.05 | 0.05 | 0.05 | 0.05 | 0.05 |
|  | Center feed port | Component (A-1) | mass % | 37.08 | 28.84 | 20.60 | 28.84 | 41.20 | 8.24 | — |
|  |  | Component (B-1) | mass % | 4.12 | 12.36 | 20.60 | — | — | 32.96 | 41.20 |
|  |  | Component (B-2) | mass % | — | — | — | 12.36 | — | — | — |
|  |  | KI | mass % | 0.18 | 0.18 | 0.18 | 0.18 | 0.18 | 0.18 | 0.18 |
|  |  | Black pigment | mass % | 0.30 | 0.30 | 0.30 | 0.30 | 0.30 | 0.30 | 0.30 |
|  | Downstream feed port | Component (D) | mass % | 40.00 | 40.00 | 40.00 | 40.00 | 40.00 | 40.00 | 40.00 |
| Evaluations | Sum |  | mass % | 100.0 | 100.0 | 100.0 | 100.0 | 100.0 | 100.0 | 100.0 |
|  | $\Delta H_{TcMt}$ |  | J/g | 32.8 | 31.6 | 12.9 | 32.0 | 35.4 | 0.0 | 0.0 |
|  | $\Delta H_{MpMt}$ |  | J/g | 31.6 | 17.0 | 3.2 | 29.4 | 48.5 | 0.0 | 0.0 |
|  | Tensile strength (70° C.) |  | MPa | 153 | 157 | 153 | 155 | 143 | 144 | 144 |
|  | Tensile strength (23° C.) |  | MPa | 180 | 201 | 212 | 200 | 171 | 218 | 201 |
|  | Notched Charpy impact strength |  | kJ/m$^2$ | 13 | 13 | 15 | 13 | 12 | 16 | 16 |
|  | Weld strength |  | MPa | 50 | 66 | 81 | 64 | 43 | 89 | 97 |
|  | Cooling time upon injection molding |  | seconds | 5 | 5 | 10 | 5 | 5 | 25 | 25 |

It was found that the tensile strengths at elevated temperatures were excellent in Examples 1 to 4. In contrast, tensile strengths at elevated temperatures were inferior in Comparative Examples 1 to 3 because $\Delta H_{TcMt}$ or $\Delta H_{MpMt}$ were out of the value ranges of the present disclosure.

INDUSTRIAL APPLICABILITY

The reinforced resin composition of the present disclosure is excellent in mechanical strength, low water absorption property, and weld strength at elevated temperatures. It is therefore particularly suitable for use in a wide variety of electrical and electronic members, battery members, and members used in optical applications.

The invention claimed is:
1. A reinforced resin composition comprising:
(A) a polyamide comprising a dicarboxylic acid unit (a) containing a terephthalic acid unit in 60 to 100 mol %, and a diamine unit (b) containing an aliphatic diamine unit having a carbon number of 9 to 12 in 60 to 100 mol %;

(B) a polyamide comprising a dicarboxylic acid unit (c) containing an isophthalic acid unit in 60 to 100 mol %, and a diamine unit (d) containing an aliphatic diamine unit having a carbon number of 4 to 10 in 80 to 100 mol %;

(C) a polyphenylene ether; and (D) an inorganic filler, wherein the mass ratio of the component (C) with respect to 100 parts by mass of a sum of the component (A), the component (B), and the component (C) is from 20 to 50 parts by mass, wherein the reinforced resin composition contains from 1 ppm to less than 200 ppm by mass of a transition metal, based on the total mass of the components (A), (B) and (C), wherein $\Delta H_{TcMt}$ expressed by the following expression is 10 J/g or more:

$$\Delta H_{TcMt} = \Delta H_{Tc} \times \{(\text{the mass of the reinforced resin composition})/(\text{the mass of the matrix component in the reinforced resin composition})\},$$

where $\Delta H_{Tc}$ is the enthalpy of crystallization of the reinforced resin composition measured by a DSC, wherein $\Delta H_{MpMt}$ expressed by the following expression is 35 J/g or less:

$$\Delta H_{MpMt} = \Delta H_{Mp} \times \{(\text{the mass of the reinforced resin composition})/(\text{the mass of the matrix component in the reinforced resin composition})\},$$

where $\Delta H_{Mp}$ is the enthalpy of fusion of the reinforced resin composition measured by the DSC, and wherein the mass of the matrix component in the reinforced resin composition is measured by dissolving the reinforced resin composition in hexafluoro-2-propanol, filtering the solution to isolate an insoluble component, drying the insoluble component under vacuum to measure the mass of the insoluble component, and determining the mass of the matrix component by subtracting the mass of the insoluble component from the mass of the reinforced resin composition.

2. The reinforced resin composition according to claim 1, wherein the component (B) comprises the dicarboxylic acid unit (c) containing the isophthalic acid unit in 75 to 100 mol %, and the diamine unit (d) containing the aliphatic diamine unit having a carbon number of 4 to 10 in 80 to 100 mol %.

3. The reinforced resin composition according to claim 2, wherein the component (A) comprises the dicarboxylic acid unit (a) containing the terephthalic acid unit in 60 to 100 mol %, and the diamine unit (b) containing a 1,9-nonane diamine unit and/or a 2-methyl-1,8-octane diamine unit in 60 to 100 mol %.

4. The reinforced resin composition according to claim 3, wherein a molar ratio of the 1,9-nonane diamine unit to the 2-methyl-1,8-octane diamine unit (1,9-nonane diamine unit/2-methyl-1,8-octane diamine unit) in the component (A) is from 100/0 to 20/80.

5. The reinforced resin composition according to claim 4, wherein a mass ratio of the component (A) with respect to 100 mass % of a sum of the component (A) and the component (B) is from 50 to 90 mass %, a weight average molecular weight of the component (B) is from 15,000 to 35,000, the component (D) contains glass fibers or a needle-like inorganic filler, and the reinforced resin composition further comprises (E) a compatibilizer, wherein the compatibilizer is a multifunctional compound that interacts with either or both of the polyphenylene ether and the polyamides.

6. The reinforced resin composition according to claim 2, wherein a mass ratio of the component (A) with respect to 100 mass % of a sum of the component (A) and the component (B) is from 50 to 90 mass %.

7. The reinforced resin composition according to claim 2, wherein a weight average molecular weight of the component (B) is from 15,000 to 35,000.

8. The reinforced resin composition according to claim 2, wherein the component (D) contains a fibrous inorganic filler or a needle-like inorganic filler.

9. The reinforced resin composition according to claim 8, wherein the fibrous inorganic filler contains glass fibers.

10. The reinforced resin composition according to claim 1, wherein the component (A) comprises the dicarboxylic acid unit (a) containing the terephthalic acid unit in 60 to 100 mol %, and the diamine unit (b) containing a 1,9-nonane diamine unit and/or a 2-methyl-1,8-octane diamine unit in 60 to 100 mol %.

11. The reinforced resin composition according to claim 10, wherein a molar ratio of the 1,9-nonane diamine unit to the 2-methyl-1,8-octane diamine unit (1,9-nonane diamine unit/2-methyl-1,8-octane diamine unit) in the component (A) is from 100/0 to 20/80.

12. The reinforced resin composition according to claim 1, wherein a mass ratio of the component (A) with respect to 100 mass % of a sum of the component (A) and the component (B) is from 50 to 90 mass %.

13. The reinforced resin composition according to claim 1, wherein a weight average molecular weight of the component (B) is from 15,000 to 35,000.

14. The reinforced resin composition according to claim 1, wherein the component (D) contains a fibrous inorganic filler or a needle-like inorganic filler.

15. The reinforced resin composition according to claim 14, wherein the fibrous inorganic filler contains glass fibers.

16. The reinforced resin composition according to claim 1, further comprising (E) a compatibilizer, wherein the compatibilizer is a multifunctional compound that interacts with either or both of the polyphenylene ether and the polyamides.

17. A molded product comprising the reinforced resin composition according to claim 1.

* * * * *